(12) United States Patent
Zhidkov (10) Patent No.: US 7,864,836 B1
(45) Date of Patent: Jan. 4, 2011

(54) ADAPTIVE ORTHOGONAL FREQUENCY DIVISION MULTIPLEXING (OFDM) EQUALIZERS, OFDM RECEIVERS INCLUDING THE SAME, AND METHODS THEREOF

(75) Inventor: Sergey Zhidkov, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 636 days.

(21) Appl. No.: 11/931,837

(22) Filed: Oct. 31, 2007

(51) Int. Cl.
*H03H 7/40* (2006.01)

(52) U.S. Cl. .................. 375/235; 375/232; 375/229

(58) Field of Classification Search .................. 375/235, 375/232, 229
See application file for complete search history.

(56) References Cited

U.S. PATENT DOCUMENTS

| | | | | |
|---|---|---|---|---|
| 7,474,611 | B2 * | 1/2009 | Svensson et al. | 370/208 |
| 7,668,269 | B2 * | 2/2010 | Ma et al. | 375/350 |
| 7,697,412 | B2 * | 4/2010 | Anderson et al. | 370/208 |
| 2003/0128656 | A1 * | 7/2003 | Scarpa | 370/203 |
| 2004/0161057 | A1 | 8/2004 | Malladi et al. | 375/340 |
| 2005/0174929 | A1 * | 8/2005 | Hayashi et al. | 370/208 |
| 2006/0056496 | A1 | 3/2006 | Smee et al. | 375/148 |
| 2007/0058734 | A1 * | 3/2007 | Kao et al. | 375/260 |
| 2007/0116141 | A1 * | 5/2007 | Li et al. | 375/260 |
| 2008/0260052 | A1 * | 10/2008 | Hayashi | 375/260 |
| 2009/0067518 | A1 * | 3/2009 | Melis et al. | 375/260 |

FOREIGN PATENT DOCUMENTS

| | | |
|---|---|---|
| EP | 1441484 A2 * | 7/2004 |
| JP | 2004228853 | 8/2004 |
| KR | 1020060044087 | 5/2006 |

OTHER PUBLICATIONS

P. Hoeher, S. Kaiser and P. Robertson, "Two-Dimensional Pilot-Symbol-Aided Channel Estimation by Wiener Filtering," in Proc. IEEE ICASSP '97, Munich, Germany pp. 18451848, Apr. 1997.
F. Sanzi and J. Speidel, "An Adaptive Two-Dimensional Channel Estimator for Wireless OFDM with Application to Mobile DVB-T," IEEE Transactions on Broadcasting, vol. 46, No. 2, Jun. 2000.
X. Hou, S. Li, D. Liu, C. Yin; G. Yue, "On-two-dimensional adaptive channel estimation in OFDM systems," IEEE 60th Vehicular Technology Conference, VTC2004-Fall, 2004.
P. Schniter, "Low-complexity Equalization of OFDM in Doubly Selective Channels," IEEE Trans. Signal Processing, vol. 52, No. 4, Apr. 2004, pp. 1002-1011.

* cited by examiner

*Primary Examiner*—Juan A Torres
(74) *Attorney, Agent, or Firm*—Myers Bigel Sibley & Sajovec (57) ABSTRACT

An orthogonal frequency division multiplexing (OFDM) equalizer includes a memory that stores OFDM frame information, a partial sum calculator configured to calculate a partial sum of a data cell corresponding to an OFDM reception signal based on a current pilot cell and a fixing coefficient corresponding to the current pilot cell, an adapting coefficient calculator configured to calculate a channel response of the data cell and calculate an adapting coefficient based on the calculated channel response and an interpolated channel response, an interpolated channel response calculator configured to calculate the interpolated channel response based on the partial sum and the adapting coefficient, and a channel compensation unit configured to output a corrected OFDM reception signal based on the fast Fourier transformed OFDM reception signal and the interpolated channel response. Related receivers and channel equalization methods are also disclosed.

22 Claims, 5 Drawing Sheets

ADAPTIVE ORTHOGONAL FREQUENCY DIVISION MULTIPLEXING (OFDM) EQUALIZERS, OFDM RECEIVERS INCLUDING THE SAME, AND METHODS THEREOF

FIELD OF THE INVENTION

The present invention relates to orthogonal frequency division multiplexing (OFDM) technology, and more particularly, to OFDM equalizers OFDM receivers including OFDM equalizers, and methods thereof.

BACKGROUND

References to the prior art are as follows:

[1] S. Haykin, Adaptive Filter Theory, 4th edition, 2002 (Chapter 2);

[2] P. Hoeher, S. Kaiser and P. Robertson, "TWO-DIMENSIONAL PILOT-SYMBOL-AIDED CHANNEL ESTIMATION BY WIENER FILTERING," in Proc. IEEE ICASSP '97, Munich, Germany, pp. 18451848, Apr. 1997;

[3] F. Sanzi and J. Speidel, "An Adaptive Two-Dimensional Channel Estimator for Wireless OFDM with Application to Mobile DVB-T," IEEE TRANSACTIONS ON BROADCASTING, VOL. 46, NO. 2, JUNE 2000;

[4] X. Hou, S. Li, D. Liu, C. Yin, G. Yue, "On two-dimensional adaptive channel estimation in OFDM systems," IEEE 60th Vehicular Technology Conference, VTC2004-Fall, 2004;

[5] P. Schniter, "Low-complexity Equalization of OFDM in Doubly Selective Channels," IEEE Trans. Signal Processing, Vol. 52, No.4, April, 2004, pp.1002-1011.

The content and technical spirit disclosed in the references may be used to clear the technical spirit of the present invention and may be included in the detailed description of the invention.

Since orthogonal frequency division multiplexing (OFDM) can overcome multi-path fading and can be efficiently embodied, it is widely used in wireless communication systems such as digital audio broadcasting (DAB), digital video broadcasting (DVB), and a wireless local area network (LAN). In order to enable an OFDM receiver to operate properly in an OFDM system, it is desirable for an equalizer in the OFDM receiver to accurately estimate a time-varying channel response.

Since a broadband fading channel can usually be viewed as a two-dimensional signal in time and frequency, the optimal solution to channel response estimation for a data cell based on scattered pilot cells may be two-dimensional (time and frequency) adaptive equalization discussed in References [1] and [2]. However, since a two-dimensional channel equalizer discussed in References [1] and [2] (hereinafter, referred to a 2D-Wiener equalizer) requires prior knowledge of the channel statistics in advance for channel response estimation, it may not be effective in a real communication environment. Moreover, the 2D-Wiener equalizer has problems of circuit complexity and power consumption, and therefore, it may not be suitable to commercial mass production of OFDM receivers.

Figure 1:
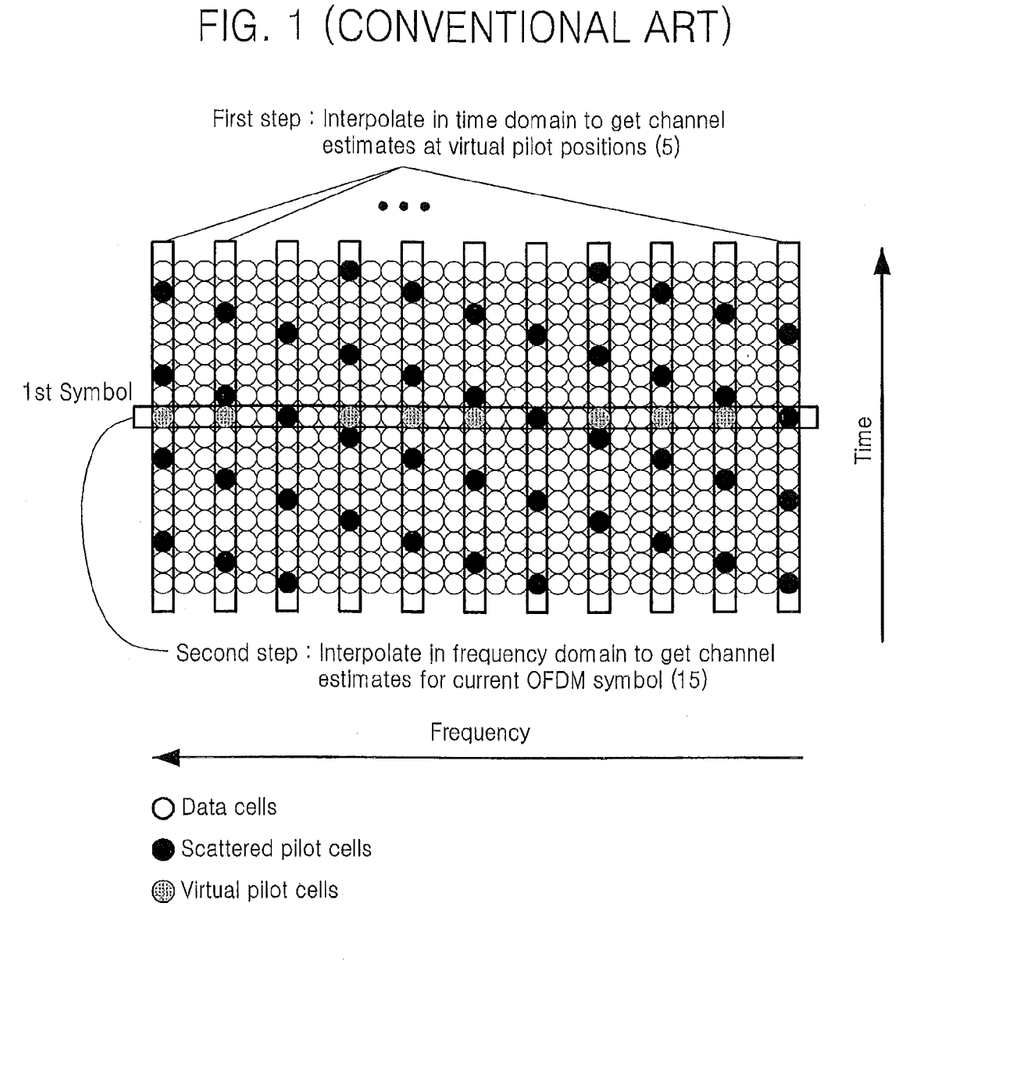
FIG. 1 illustrates methods of estimating a channel response of a data cell using a conventional equalizer.

FIG. 1 illustrates methods of estimating a channel response of a data cell using a conventional equalizer. Referring to FIG. 1, the equalizer estimates a channel response based on a predetermined number of scattered pilot cells which can be uniformly distributed in an OFDM signal in time and frequency domains. For example, in order to estimate a channel response for each of the data cells in a first OFDM symbol among a plurality of OFDM symbols, the equalizer may interpolate virtual pilot cells in the time domain based on the scattered pilot cells in the time domain in a first step 5. In a second step 15, the equalizer may interpolate in the frequency domain based on the channel responses of the respective virtual pilot cells and the scattered pilot cells in the frequency domain. However, the-above described one-dimensional equalizer, which performs one-dimensional channel equalization, may not be effective in an environment with time-frequency correlation, such as a mobile multi-path fading channel, and may have lower performance than the 2D-Wiener equalizer discussed in Reference [2].

Reference [3] discusses an equalizer which is made simpler than the 2D-Wiener equalizer discussed in Reference [2] by using filters in fixed time and frequency domains. The equalizer discussed in Reference [3] uses a filter adapted to Wiener filter theory in the worst scenario but does not show better performance than the 2D-Wiener equalizer discussed in Reference [2].

Adaptive two-dimensional channel estimation based on a two-dimensional least mean square (2D-LMS) algorithm does not need statistics of channels and can be effectively used for calculation of time-frequency correlation of a frequency response of a time-varying distributed fading channel. An equalizer using the 2D LMS algorithm (hereinafter, referred to as a 2D-LMS equalizer) is discussed in Reference [4]. The 2D-LMS equalizer can be more effective and designed more simply than the 2D-Wiener equalizer, but it may have greater complexity than the one-dimensional equalizer since it may use a large number of variable coefficients in the time and frequency domains. In other words, since the 2D-LMS equalizer uses many variable coefficients, it may perform equalization more slowly and may not detect quickly time-varying channel characteristics. Moreover, since the 2D-LMS equalizer requires a specially designed training sequence, it cannot be easily used in existing systems such as DVB-T or DVB-H.

SUMMARY

Some embodiments of the present invention provide adaptive orthogonal frequency division multiplexing (OFDM) equalizers having higher performance and/or lower complexity by using a characteristic of time-frequency correlation during channel response estimation, OFDM receivers including the OFDM equalizer, and methods thereof.

Some embodiments of the present invention provide OFDM equalizers for equalizing an OFDM signal in response to a quick change in a state of a time-varying channel, OFDM receivers including the OFDM equalizer, and methods thereof.

Some embodiments of the present invention provide OFDM equalizers for equalizing OFDM signals using pilot cells used in existing digital video broadcasting-terrestrial (DVB-T) and/or digital video broadcasting-handheld (DVB-H) systems without generating a new parameters, such astraining sequences, OFDM receivers including the OFDM equalizer, and methods thereof.

According to some embodiments of the present invention, there is provided an OFDM equalizer including a memory configured to store OFDM frame information relative to an OFDM frame including a plurality of data cells and a plurality of pilot cells of a fast Fourier transformed OFDM reception signal, a partial sum calculator configured to calculate a partial sum of a data cell of the plurality of data cells based on a current pilot cell among the plurality of pilot cells and a fixing coefficient corresponding to the current pilot cell, an adapting coefficient calculator configured to calculate a channel response of the data cell and adaptively calculate an adapting coefficient based on the calculated channel response and an interpolated channel response, an interpolated channel response calculator configured to calculate the interpolated channel response based on the partial sum output from the partial sum calculator and the adapting coefficient, and a channel compensation unit configured to output a corrected OFDM reception signal based on the fast Fourier transformed OFDM reception signal and the interpolated channel response.

The fixing coefficient may be selected in accordance with the channel delay spread information indicating delay between paths in a multipath communication channel used to transfer the OFDM reception signal.

The interpolated channel response may be expressed by $$\hat{H}_k^t = \sum_{m \in M} c_m v[m]$$

where $\hat{H}_k^t$ is the interpolated channel response with respect to the data cell positioned at a k-th subcarrier and a t-th OFDM symbol in the OFDM frame information, $c_m$ is the adapting coefficient, m is a natural number or "0", and v[m] is an m-th partial sum.

Alternatively, the interpolated channel response may be expressed by $$\hat{H}_k^t = v[0] + \sum_{m \in M} c_m v[m]$$

where $\hat{H}_k^t$ is the interpolated channel response with respect to the data cell positioned at a k-th subcarrier and a t-th OFDM symbol in the OFDM frame, m is a natural number, v[0] is a partial sum obtained at the OFDM symbol where the data cell is positioned, v[m] is an m-th partial sum, and $c_m$ is the adapting coefficient.

The partial sum may be calculated using a fixing coefficient of the current pilot cell and a channel response of the current pilot cell.

The adapting coefficient calculator may update a pre-update adapting coefficient based on an error signal calculated using a difference between the channel response of the data cell and the interpolated channel response and the pre-update adapting coefficient and output an updated adapting coefficient as the adapting coefficient.

The updated adapting coefficient may be expressed by $c_m^{(n+1)} = c_m^{(n)} + \Delta\{\Re(e_k^t)\Re(v[m]) + \Im(e_k^t)\Im(v[m])\}$ where $c_m^{(n+1)}$ is the updated adapting coefficient, $c_m^{(n)}$ is the pre-update adapting coefficient, $\Delta$ is a predetermined step parameter, $e_k^t$ is the error signal, and v[m] is the partial sum.

The error signal may be expressed by $e_k^t = H_k^t - \hat{H}_k^t$ or $e_k^t = |H_k^t|(H_k^t - \hat{H}_k^t)$ where $e_k^t$ is the error signal, $\hat{H}_k^t$ is the interpolated channel response of the data cell positioned at a k-th subcarrier and a t-th OFDM symbol in the OFDM frame information, and $H_k^t$ is a channel response of the data cell positioned at the k-th subcarrier and the t-th OFDM symbol.

The corrected OFDM reception signal may be expressed by $$S_k^t = \frac{r_k^t}{\hat{H}_k^t}$$

where $s_k^t$ is the corrected OFDM reception signal, $r_k^t$ is an OFDM reception signal, and $\hat{H}_k^t$ is the interpolated channel response of the data cell positioned at a k-th subcarrier and a t-th OFDM symbol in the OFDM frame information.

Alternatively, the corrected OFDM reception signal may be expressed by $$S_k^t = r_k^t \frac{(\hat{H}_k^t)^*}{|\hat{H}_k^t|^2 + \sigma_n^2}$$

where $s_k^t$ is the corrected OFDM reception signal, $r_k^t$ is an OFDM reception signal, and $\sigma_n^2$ is a white Gaussian noise variance.

According to other embodiments of the present invention, there is provided an OFDM receiver including the above-described OFDM equalizer.

According to further embodiments of the present invention, a channel equalization method includes calculating and outputting a partial sum of a data cell among a plurality of data cells of a fast Fourier transformed OFDM reception signal based on a current pilot cell among a plurality of pilot cells and a fixing coefficient corresponding to the current pilot cell, calculating a channel response of the data cell and adaptively calculating and outputting an adapting coefficient based on the calculated channel response and an interpolated channel response, calculating and outputting the interpolated channel response based on the partial sum and the adapting coefficient, and outputting a corrected OFDM reception signal based on the fast Fourier transformed OFDM reception signal and the interpolated channel response.

The fixing coefficient may be selected in accordance with the channel delay spread information indicating the maximum delay between paths in the multipath communication channel used to transfer OFDM signal.

The interpolated channel response may be expressed by $$\hat{H}_k^t = \sum_{m \in M'} c_m v[m]$$

where $\hat{H}_k^t$ is the interpolated channel response with respect to the data cell positioned at a k-th subcarrier and a t-th OFDM symbol in OFDM frame information including a plurality of the data cells and a plurality of the pilot cells, $c_m$ is the adapting coefficient, m is a natural number or "0", and v[m] is an m-th partial sum.

Alternatively, the interpolated channel response may be expressed by $$\hat{H}_k^t = v[0] + \sum_{m \in M} c_m v[m]$$

where $\hat{H}_k^t$ is the interpolated channel response with respect to the data cell positioned at a k-th subcarrier and a t-th OFDM symbol in OFDM frame information including a plurality of the data cells and a plurality of the pilot cells, m is a natural number, v[0] is a partial sum obtained at the OFDM symbol where the data cell is positioned, v[m] is an m-th partial sum, and $c_m$ is the adapting coefficient.

The partial sum may be calculated using a fixing coefficient of the current pilot cell and a channel response of the current pilot cell.

The calculating and outputting the adapting coefficient may include updating a pre-update adapting coefficient based on an error signal calculated using a difference between the channel response of the data cell and the interpolated channel response and the pre-update adapting coefficient and outputting an updated adapting coefficient as the adapting coefficient.

The updated adapting coefficient may be expressed by $c_m^{(n+1)} = c_m^{(n)} + \Delta\{\Re(e_k^t)\Re(v[m]) + \Im(e_k^t)\Im(v[m])\}$ where $c_m^{(n+1)}$ is the updated adapting coefficient, $c_m^{(n)}$ is the pre-update adapting coefficient, $\Delta$ is a predetermined step parameter, $e_k^t$ is the error signal, and $v[m]$ is the partial sum.

The error signal may be expressed by $e_k^t = H_k^t - \hat{H}_k^t$ or $e_k^t = |H_k^t|(H_k^t - \hat{H}_k^t)$ where $e_k^t$ is the error signal, $\hat{H}_k^t$ is the interpolated channel response of the data cell positioned at a k-th subcarrier and a t-th OFDM symbol in OFDM frame information_including a plurality of the data cells and a plurality of the pilot cells, and $H_k^t$ is a channel response of the data cell positioned at the k-th subcarrier and the t-th OFDM symbol.

The corrected OFDM reception signal may be expressed by $$S_k^t = \frac{r_k^t}{\hat{H}_k^t}$$

where $s_k^t$ is the corrected OFDM reception signal, $r_k^t$ is an OFDM reception signal, and $\hat{H}_k^t$ is the interpolated channel response of the data cell positioned at a k-th subcarrier and a t-th OFDM symbol in OFDM frame information_including a plurality of the data cells and a plurality of the pilot cells.

Alternatively, the corrected OFDM reception signal may be expressed by $$S_k^t = r_k^t \frac{(\hat{H}_k^t)^*}{|\hat{H}_k^t|^2 + \sigma_n^2}$$

where $s_k^t$ is the corrected OFDM reception signal, $r_k^t$ is an OFDM reception signal, and $\sigma_n^2$ is a white Gaussian noise variance.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

Figure 2:
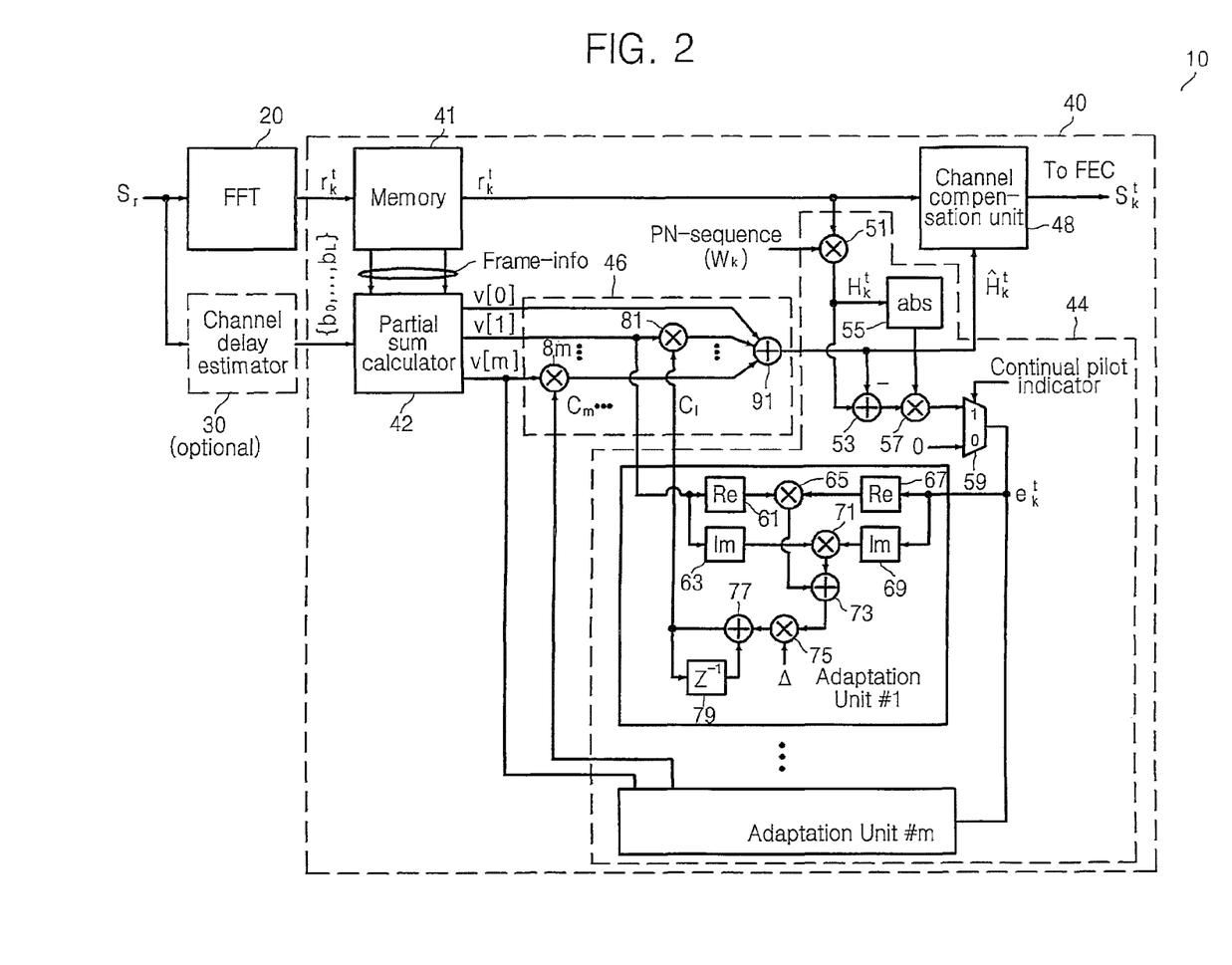
FIG. 2 is a block diagram of an orthogonal frequency division multiplexing (OFDM) receiver according to some embodiments of the present invention.

FIG. 2 is a block diagram of an orthogonal frequency division multiplexing (OFDM) receiver 10 according to some embodiments of the present invention. The OFDM receiver 10 may include a fast Fourier transform (FFT) unit 20, an optional channel delay estimator 30, and an OFDM equalizer for an adaptive OFDM equalizer or a two-dimensional equalizer) 40.

The FFT unit 20 may perform FFT of an OFDM reception signal $s_r$ and output a fast Fourier transformed (hereinafter FFTed) OFDM reception signal $r_k^t$. The OFDM reception signal $s_r$ may be an OFDM signal that has been demodulated by a demodulator (not shown) after being generated by an OFDM transmitter (not shown).

The channel delay estimator 30 may calculate or estimate a maximum channel delay or maximum channel delay spread of a multi-path component based on the OFDM reception signal $s_r$ and may output at least one fixing coefficient from among a plurality of prestored fixing coefficients $b_0$ through $b_L$ based on a calculation or estimation result.

The fixing coefficients $b_0$ through $b_L$ may be selected in accordance with the channel delay spread information indicating the maximum delay between paths in the multipath communication channel used to transfer the OFDM signal.

The channel delay spread information indicates the degree of relation between frequency components of the OFDM reception signal $s_r$. For example, when a channel delay spread is short, the relation between the frequency components of the OFDM reception signal $s_r$ is strong. When the channel delay spread is long, the relation between the frequency components of the OFDM reception signal $s_r$ is weak. The fixing coefficients $b_0$ through $b_L$ may correspond to one of three states, e.g., a short delay spread, an intermediate delay spread, and a long delay spread, of the channel delay spread.

Figure 3:
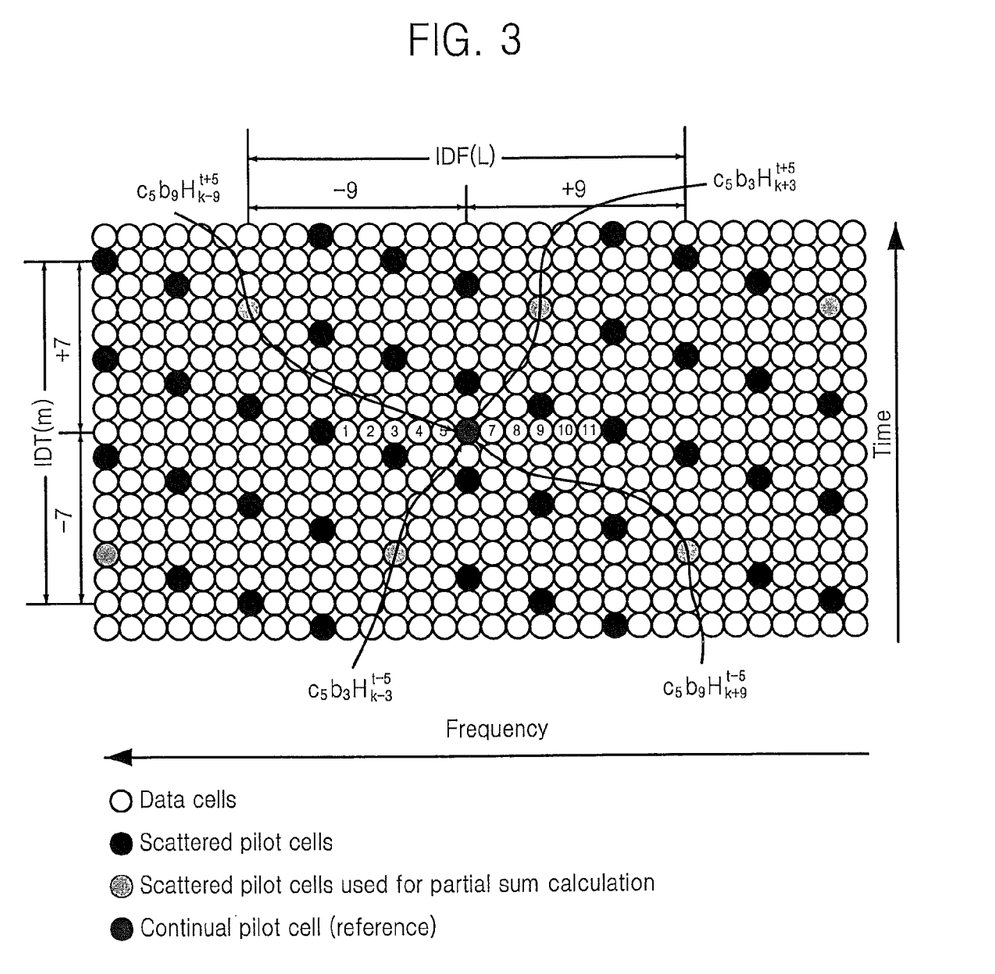
FIG. 3 illustrates an arrangement of scattered pilot cells and data cells to illustrate the calculation of partial sums by an OFDM equalizer illustrated in FIG. 2, according to some embodiments of the present invention.

The OFDM equalizer 40 may calculate an interpolated channel response $\hat{H}_k^t$ based on prestored OFDM frame information (hereinafter frame-info) including a plurality of data cells and a plurality of pilot cells, a current pilot cell among the plurality of pilot cells, and a fixing coefficient corresponding to the current pilot cell among the fixing coefficients $b_0$ through $b_L$ stored in the channel delay estimator 30. The equalizer 40 may output a corrected OFDM reception signal $s_k^t$ based on the interpolated channel response $\hat{H}_t^r$. The OFDM frame-info may include information about positions of data cells, positions of scattered pilot cells, and a position of a continual pilot cell as illustrated in the arrangement of the scattered pilot cells (FIG. 3).

The OFDM equalizer 40 may include a memory 41, a partial sum calculator 42, an adapting coefficient calculator 44, an interpolated channel response calculator 46, and a channel compensation unit 48. The memory 41 may store the OFDM frame-info including the plurality of data cells and the plurality of pilot cells. For example, the memory 41 may store information about the positions of the data cells having data information transmitted by the OFDM transmitter in a time (or symbol) domain and a frequency (or subcarrier or sample) domain, the positions of the scattered pilot cells, and the position of the continual pilot cell, as illustrated in the arrangement of the scattered pilot cells (FIG. 3) in a digital video broadcasting-terrestrial (DVB-T) system.

The scattered pilot cells are inserted by the OFDM transmitter and are used by the receiver to estimate channel information of the data cells. The channel information of each data cell can be estimated by the interpolation of channel information of relevant cells among the scattered pilot cells. As is well known to those of ordinary skill in the art, a scattered pilot cell may be inserted every 12 subcarriers (or samples) on the frequency domain and may be inserted every 4 symbols on the time domain in the DVB-T system, as illustrated in FIG. 3.

The partial sum calculator 42 may calculate a partial sum of a data cell corresponding to the FFTed OFDM reception signal $r_k^t$ among the plurality of data cells based on a current pilot cell among the plurality of pilot cells prestored in the memory 41 and a fixing coefficient corresponding to the current pilot cell. The fixing coefficient is allocated to each of the pilot cells on the frequency domain and, as is explained in the description of the channel delay estimator 30, it may be channel delay spread information indicating the amount of delay of the OFDM reception signal $s_r$ in a predetermined channel.

The partial sum is calculated to seek the interpolated channel response. The partial sum can be calculated based on scattered pilot cells that fall at predetermined intervals relative to a data cell corresponding to a fast Fourier transformed OFDM reception signal and fixing coefficients allocated to positions of the scattered pilot cells in the arrangement of the scattered pilot cells (FIG. 3)

A process in which the partial sum calculator 42 calculates the partial sum of the data cell corresponding to the FFTed OFDM reception signal $r_k^t$ will be described in detail below.

The channel response $\hat{H}_k^t$ interpolated by the OFDM equalizer 40 may be expressed by Equation (1):

$$\hat{H}_k^t = \sum_{m \subset M, n \subset N} a_{m,n} H_{k+n}^{t+m} \quad (1)$$

where $\hat{H}_k^t$ is the interpolated channel response with respect to a data cell positioned at a k-th subcarrier and a t-th OFDM symbol on the arrangement of scattered pilot cells (e.g., the arrangement illustrated in FIG. 3), $H_k^t$ is a channel response estimated for the OFDM data cell positioned at the k-th subcarrier and the t-th OFDM symbol, $a_{m,n}$ is a two-dimensional (2D) equalization coefficient for the data cell position (t, k), and M and N are variables indicating the positions of scattered pilot cells used to estimate channel information for the data cell (e.g., variables indicating scattered pilots which can exist in a range of ±24 subcarriers (or samples) and ±7 OFDM symbols from the data cell position (t, k)). However, the number of coefficients $a_{m,n}$ may become so large that the complexity of the OFDM equalizer 40 is increased and channel adaptation speed is decreased.

Thus, in some embodiments the OFDM equalizer 40 may output the interpolated channel response expressed by Equation (2), as follows:

$$\hat{H}_k^t = \sum_{m,n} c_m b_n H_{k+n}^{t+m} \quad (2)$$

where $c_m$ is an adapting coefficient allocated to a scattered pilot on the time domain in the arrangement of scattered pilot cells represented in a time-frequency domain (e.g., the arrangement in FIG. 3) and $b_n$ is a fixing coefficient allocated to the scattered pilot cell on the frequency domain in the arrangement. The fixing coefficient $b_n$ may correspond to one of the fixing coefficients $b_0$ through $b_L$ output from the channel delay estimator 30.

In Equation (2), when the imaginary part of $c_m$ is "0" and the parameter of $c_m$ is fixed to a predetermined value, the interpolated channel response $\hat{H}_k^t$ can be simplified. For example, in a high signal-to-noise environment, $c_0$, i.e., a data cell with an index "6" among data cells with indexes "1" through "11" (or an adapting coefficient of a symbol where a continual pilot cell (which is a reference) is positioned) may be "1" and adapting coefficients $c_{-8}$, $c_{-4}$, and $c_8$ of symbols positioned at −8th place, −4th place, 4th place, and 8th place, respectively, from the data cell with the index "6" may be "0" in the arrangement illustrated in FIG. 3. In addition, since $c_m$ has a symmetrical characteristic according to a Doppler fading channel characteristic, $c_{-m} = c_m$ may be effected.

In other words, the number of coefficients used to calculate the interpolated channel response $\hat{H}_k^t$ can be decreased through the above-described scheme. For instance, when an interpolation depth in the time domain (denoted by IDT in FIG. 3) is ±7 OFDM symbols, the number of adapting coefficients $c_m$ needed to calculate the interpolated channel response $\hat{H}_k^t$ is six, i.e., $c_1, c_2, c_3, c_5, c_6$, and $c_7$, so that $\hat{H}_k^t$ can be calculated quickly.

Accordingly, the OFDM equalizer 40 can calculate the interpolated channel response $\hat{H}_k^t$ using Equation (3), as follows:

$$\hat{H}_k^t = \sum_{m \in M'} c_m v[m] \quad (3)$$

where $v[m]$ is a partial sum calculated using scattered pilot cells of an m-th symbol and M' is a set of natural numbers and "0".

In addition, when in is "0" in Equation (2), $c_0$, i.e., an adapting coefficient of a symbol where the data cell is positioned, is "1" in the high signal-to-noise environment, and therefore, Equation (3) may be rewritten as Equation (4), as follows:

$$\hat{H}_k^t = v[0] + \sum_{m \in M} c_m v[m] \quad (4)$$

where $v[0]$ is a partial sum when m is "0".

FIG. 3 illustrates the arrangement of scattered pilot cells and data cells, and illustrates methods in which the OFDM equalizer 40 illustrated in FIG. 2 calculates a partial sum, according to some embodiments of the present invention. Referring to FIG. 3, the scattered pilot cells are inserted by an OFDM transmitter (not shown) to be used to estimate channel information of the data cells. The channel information of each data cell can be estimated by the interpolation of channel information of relevant cells among the scattered pilot cells. As is well known to those of ordinary skill in the art, a scattered pilot cell may be inserted every 12 subcarriers (or samples) on the frequency domain and may be inserted every 4 symbols on the time domain in DVB-T systems, as illustrated in FIG. 3.

In embodiments of the present invention, the data cell with index "6" may be the continual pilot cell or a normal data cell. When the data cell with index "6" is the continual pilot cell, a channel response with respect to the continual pilot cell is already included in the OFDM frame-info stored in the memory 41, so the channel response included in the OFDM frame-info may be the channel response of the data cell with index "6". The channel response may be compared with a channel response, which is calculated by the OFDM equalizer 40 based on the scattered pilot cells, and it may be detected based on a comparison result whether there is an error in the channel response included in the OFDM frame-info.

The OFDM equalizer 40 may calculate the partial sum $v[m]$ in Equation (4) using Equation (5).

$$v[m] = \begin{cases} \sum_{j=-L:12:L} b_{j-u} H_{k+j-u}^t, & m = 0 \\ \sum_{j=-L:12:L} (b_{j-u+3} H_{k+j-u+3}^{t+m} + b_{j-u-3} H_{k+j-u-3}^{t-m}), & m = 1, 5 \\ \sum_{j=-L:12:L} (b_{j-u+3} H_{k+j-u+3}^{t-m} + b_{j-u-3} H_{k+j-u-3}^{t+m}), & m = 3, 7 \\ \sum_{j=-L:12:L} b_{j-u+6} (H_{k+j-u+6}^{t-m} + H_{k+j-u+6}^{t+m}), & m = 2, 6 \end{cases} \quad (5)$$

where L is a frequency-domain interpolation depth IDF and u is an index of the data cell, which is determined by the arrangement of scattered pilots (e.g. in FIG. 3, numbers in cells indicate index u).

For example, when in is "5", the partial sum $v[m]$ may be expressed by Equation (6):

$$v[5] = b_3 H_{k-3}^{t-5} + b_3 H_{k+3}^{t+5} + b_9 H_{k+9}^{t-5} + b_9 H_{k-9}^{t+5} \quad (6)$$

In other words, since the number of parameters necessary for the calculation of the interpolated channel response $\hat{H}_k^t$ can be reduced by using the partial sum $v[m]$ in Equation (4), the estimation of the interpolated channel response $\hat{H}_k^t$ according to some embodiments of the present invention can provide faster adaptation speeds for a time-varying channel and channel equalization methods with lower complexity.

The adapting coefficient calculator 44 may calculate the channel response $H_k^t$ of a data cell and calculate the adapting coefficient $c_m$ based on the calculated channel response $H_k^t$. The adapting coefficient $c_m$ is a coefficient associated with the partial sum $v[m]$, obtained as illustrated in FIG. 3. The adapting coefficient calculator 44 may update the adapting coefficient $c_m$ according to time variation. For example, the adapting coefficient calculator 44 may calculate the adapting coefficient $c_m$ using Equation (7) based on the partial sum $v[m]$ of the data cell and a least-mean square (LMS) algorithm.

$$c_m^{(n+1)} = c_m^{(n)} + \Delta \{\Re(e_k^t) \Re(v[m]) + \Im(e_k^t) \Im(v[m])\} \quad (7)$$

where $c_m^{(n+1)}$ is an updated adapting coefficient, $c_m^{(n)}$ is an adapting coefficient before the updating (hereinafter, "pre-update adapting coefficient"), $\Delta$ is a predetermined step parameter, $e_k^t$ is an error signal, $v[m]$ is the partial sum, and $\Re(\cdot)$ and $\Im(\cdot)$ are a real part and an imaginary part, respectively, of the argument $(\cdot)$.

In other words, an OFDM equalizer 40 according to some embodiments of the present invention may update the adapting coefficient $c_m^{(n)}$ using the adapting coefficient $c_m^{(n)}$ used in existing DVB-T or DVB-handheld (H) systems and may use the updated adapting coefficient $c_m^{(n+1)}$ for channel equalization, without generating a new parameter, such as a training sequence used in the 2D-LMS disclosed in Reference [4], thereby reducing complexity. In addition, the OFDM equalizer 40 can also equalize an OFDM signal without a great change in performance even under quick changes in a state of a time-varying channel.

The error signal $e_k^t$ may be expressed by Equation (8), as follows:

$$e_k^t = H_k^t - \hat{H}_k^t \quad (8)$$

where $\hat{H}_k^t$ is an interpolated channel response of the data cell positioned at the k-th subcarrier and the t-th OFDM symbol in the OFDM frame-info, and $H_k^t$ is a channel response of the data cell positioned at the k-th subcarrier and the t-th OFDM symbol.

The error signal $e_k^t$ may also be expressed by Equation (9), as follows:

$$e_k^t = |H_k^t|(H_k^t - \hat{H}_k^t) \qquad (9)$$

Compared to Equation (8), a multiplier exists in Equation (9). The multiplier $|H_k^t|$ is a value for scaling the error signal in Equation (8). As a result of the scaling, noise variance can be reduced and/or eliminated from the updated adapting coefficient $c_m^{(n+1)}$. For example, when the multiplier is "0", fading may occur since noise strongly influences a weak subcarrier. However, when the error signal $e_k^t$ is scaled using the multiplier $|H_k^t|$, subcarriers subjected to the fading can be excluded through adjustment of the updated adapting coefficient $c_m^{(n+1)}$.

The adapting coefficient calculator 44 may include a first operation unit 51, a second operation unit 53, an absolute value calculator 55, a third operation unit 57, a selector 59, and first through m-th adaptation units #1 through #m.

The first operation unit 51 multiplies the FFTed OFDM reception signal $r_k^t$ by a pseudo-noise (PN)-sequence $w_k$. In detail, the first operation unit 51 can output the channel response $H_k^t$ of a data cell, which corresponds to the FFTed OFDM reception signal $r_k^t$ at the position of the k-th subcarrier and the t-th OFDM symbol in the arrangement illustrated in FIG. 3, by multiplying the FFTed OFDM reception signal $r_k^t$ by the PN-sequence $w_k$.

The second operation unit 53 subtracts the interpolated channel response $\hat{H}_k^t$ output by the interpolated channel response calculator 46 from the channel response $H_k^t$ output from the first operation unit 51.

The absolute value calculator 55 calculates the absolute value of the channel response $H_k^t$ of the data cell and outputs a calculation result.

The third operation unit 57 may multiply an output of the second operation unit 53 by an output of the absolute value calculator 55.

The selector 59 may output a multiplication result from the third operation unit 57 or "0" in response to a continual pilot indicator. The continual pilot indicator is a signal generated when the OFDM equalizer 40 performs channel estimation with respect to a continual pilot cell (e.g., a data cell with index "6") among data cells forming symbol lines corresponding to the FFTed OFDM reception signal $r_k^t$ in the arrangement illustrated in FIG. 3.

For example, the selector 59 may output the multiplication result from the third operation unit 57 in response to the continual pilot indicator at a first logic level (e.g., a high level of "1"). In other words, an output of the selector 59 is expressed by Equation (10) when the continual pilot indicator is at the first logic level. In addition, the selector 59 may output "0" in response to the continual pilot indicator at a second logic level (e.g., a low level of "0").

Each of the first through m-th adaptation units #1 through #m may update at least one of the adapting coefficients $c_1$ through $c_m$ (i.e., $c_m^{(n)}$ in Equation (7)) respectively corresponding to one or more partial sums v[0] through v[m] output from the partial sum calculator 42 based on the output of the selector 59 and the previous adapting coefficients $c_1$ through $c_m$ and may output an update result (i.e., $c_m^{(n+1)}$ in Equation (7)) as a new adapting coefficient $c_1, \ldots,$ or $c_m$. In other words, the outputs of the first through m-th adaptation units #1 through #m may expressed by Equation (7).

The first adaptation unit #1 may include a first real part extractor 61, a first imaginary part extractor 63, a fourth operation unit 65, a second real part extractor 67, a second imaginary part extractor 69, a fifth operation unit 71, a sixth operation unit 73, a seventh operation unit 75, an eighth operation unit 77, and a delay unit 79. The first real part extractor 61 may extract a real part of a partial sum v[1] when m is "1" in Equation (4), and the first imaginary part extractor 63 may extract an imaginary part of the partial sum v[1] when m is "1" in Equation (4). The fourth operation unit 65 may multiply an extraction result from the first real part extractor 61 by an extraction result from the second real part extractor 67 and output a multiplication result. The second real part extractor 67 may extract a real part of the error signal $e_k^t$ in Equation (9), which is output from the selector 59, and the second imaginary part extractor 69 may extract an imaginary part of the error signal $e_k^t$. The fifth operation unit 71 may multiply an extraction result from the first imaginary part extractor 63 by an extraction result from the second imaginary part extractor 69 and output a multiplication result. The sixth operation unit 73 may add an output from the fourth operation unit 65 and an output from the fifth operation unit 71 and output an addition result. The seventh operation unit 75 may multiply an output from the sixth operation unit 73 by the predetermined step parameter $\Delta$ and output a multiplication result. The eighth operation unit 77 may add an output from the seventh operation unit 75 and an output from the delay unit 79 and output an addition result as an updated adapting coefficient $c_1$. The delay unit 79 may delay the current adapting coefficient $c_1$ by a predetermined period of time and output a delay result as a previous adapting coefficient.

The interpolated channel response calculator 46 may calculate the interpolated channel response $\hat{H}_k^t$ based on a partial sum output from the partial sum calculator 42 and an adapting coefficient output from the adapting coefficient calculator 44. For instance, the interpolated channel response calculator 46 may calculate the interpolated channel response $\hat{H}_k^t$ using Equation (3) or (4) based on the partial sum output from the partial sum calculator 42 and the adapting coefficient output from the adapting coefficient calculator 44.

The interpolated channel response calculator 46 may include first through m-th operation units 81 through 8m and a ninth operation unit 91. Each of the first through m-th operation units 81 through 8m may multiply a corresponding one of the adapting coefficients $c_1$ through $c_m$ output from the first through m-th adaptation units #1 through #m by a corresponding one of the at least one partial sums output from the partial sum calculator 42 and output a multiplication result.

The ninth operation unit 91 may add one or more multiplication results output from the first through m-th operation units 81 through 8m and output an addition result. In other words, the addition result output from the ninth operation unit 91 may be expressed by Equation (3) or (4).

The channel compensation unit 48 may output the corrected OFDM reception signal $s_k^t$ based on the FFTed OFDM reception signal $r_k^t$ and the interpolated channel response $\hat{H}_k^t$. The corrected OFDM reception signal $s_k^t$ may be expressed by Equation (10):

$$S_k^t = \frac{r_k^t}{\hat{H}_k^t} \qquad (10)$$

where $s_k^t$ is the corrected OFDM reception signal, $r_k^t$ is the FFTed OFDM reception signal, and $\hat{H}_k^t$ is the interpolated channel response of the data cell positioned at the k-th subcarrier and the t-th OFDM symbol in the OFDM frame-info.

In other words, the channel compensation unit 48 may output a channel inversion result obtained through a least-squares (LS) algorithm.

The corrected OFDM reception signal $s_k^t$ may also be expressed by Equation (11):

$$s_k^t = r_k^t \frac{(\hat{H}_k^t)^*}{|\hat{H}_k^t|^2 + \sigma_n^2} \quad (11)$$

where $s_k^t$ is the corrected OFDM reception signal, $r_k^t$ is the FFTed OFDM reception signal, and $\sigma_n^2$ is a white Gaussian noise variance. In other words, the channel compensation unit 48 may output a channel inversion result using an LMS algorithm.

The channel compensation unit 48 may include a channel inverter (not shown). In this case, the channel inverter may detect a characteristic of a time-varying mobile channel and output the corrected OFDM reception signal $s_k^t$ based on a detection result. For instance, the channel inverter may be a minimum-mean square error equalizer, as discussed in Reference [5].

The corrected OFDM reception signal $s_k^t$ output from the channel compensation unit 48 may be input to a forward error correction (FEC) unit and then decoded.

Figure 4:
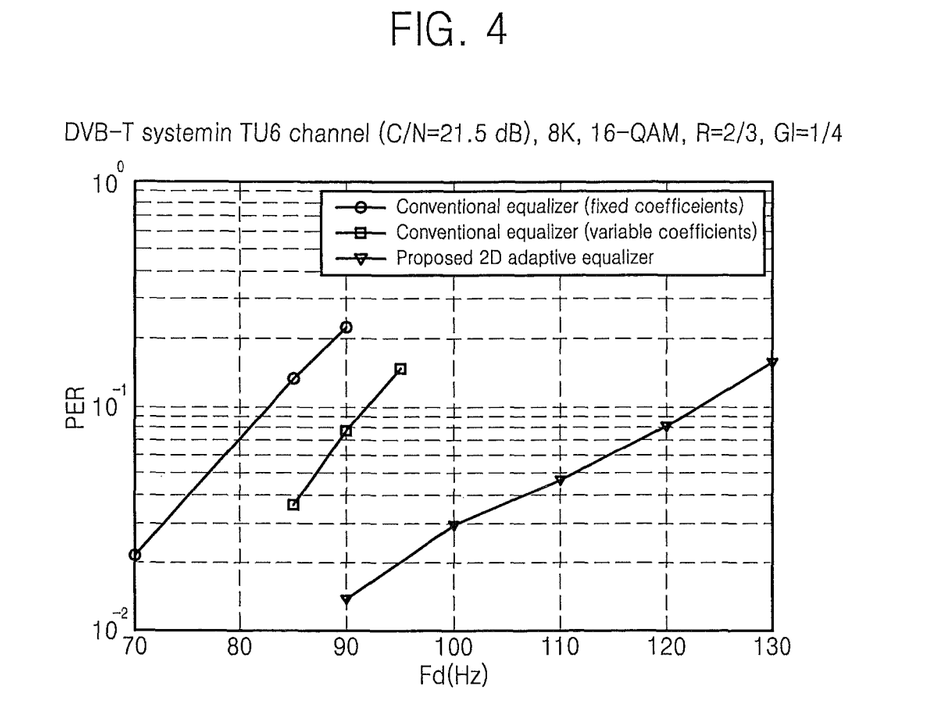
FIG. 4 illustrates a comparison between simulation results of the OFDM equalizer illustrated in FIG. 2 and simulation results of a conventional OFDM equalizer.

FIG. 4 illustrates a comparison between simulation results of the OFDM equalizer 40 illustrated in FIG. 2 and simulation results of a conventional OFDM equalizer. Referring to FIGS. 2 and 4, when a Doppler frequency Fd is high, that is, when a relative movement speed between the transmitter and receiver is fast, the 2D adaptive OFDM equalizer 40 may have a lower packet error ratio (PER) with respect to channel response estimation compared to a conventional equalizer using fixing coefficients and a conventional equalizer using variable coefficients, thereby showing high performance. For example, as shown in FIG. 4, the OFDM equalizer 40 according to some embodiments of the present invention has the lowest PER at a Doppler frequency Fd of 90 Hz.

Figure 5:
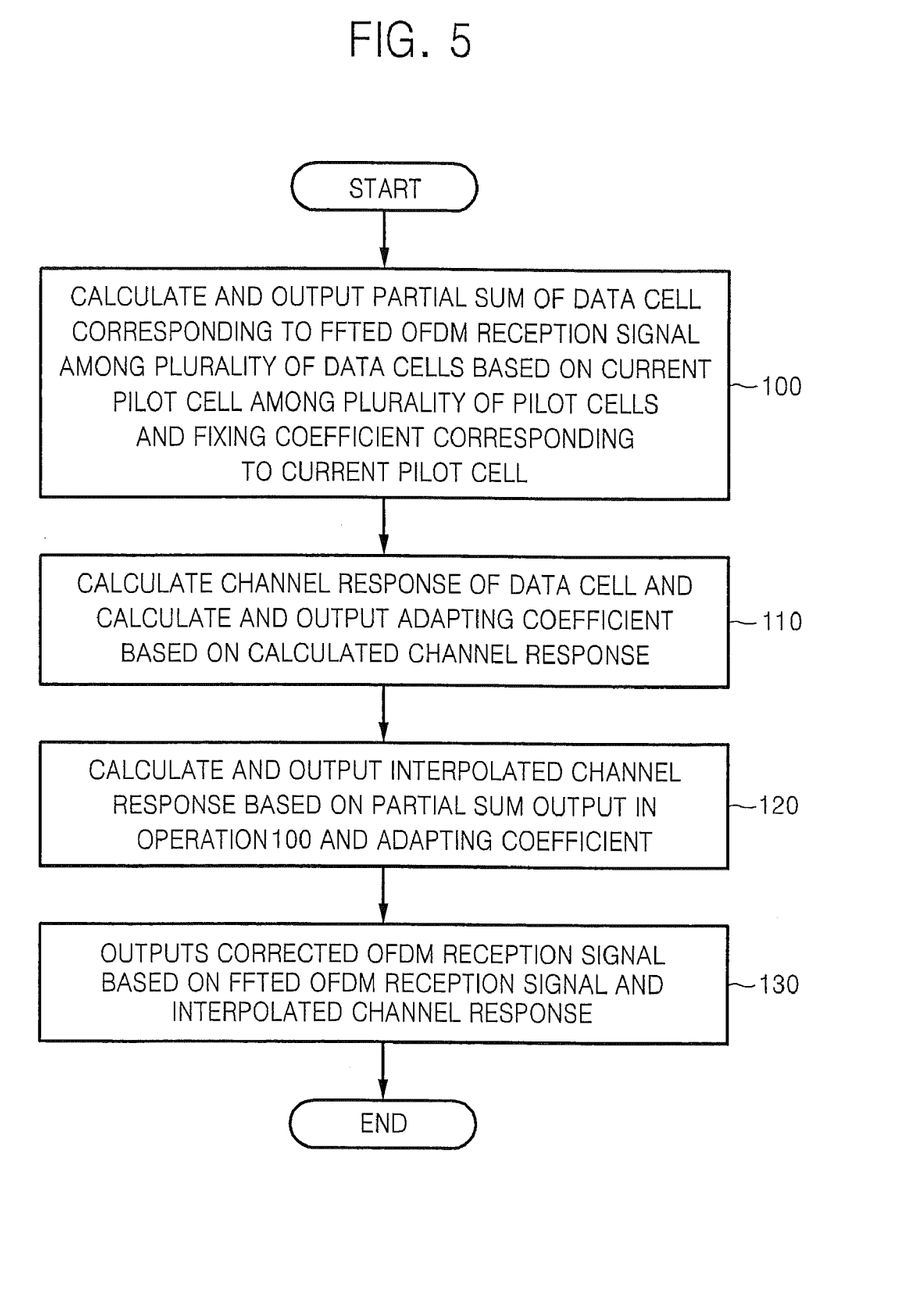
FIG. 5 is a flowchart illustrating channel equalization methods and/or systems according to some embodiments of the present invention.

FIG. 5 is a flowchart illustrating channel equalization systems and/or methods according to some embodiments of the present invention. Referring to FIGS. 2 and 5, the partial sum calculator 42 calculates and outputs a partial sum of a data cell corresponding to an FFTed OFDM reception signal $r_k^t$ among a plurality of data cells based on a current pilot cell among a plurality of pilot cells and a fixing coefficient corresponding to the current pilot cell in operation 100. The adapting coefficient calculator 44 calculates a channel response $H_k^t$ of the data cell and calculates and outputs an adapting coefficient based on the calculated channel response $H_k^t$ in operation 110. The interpolated channel response calculator 46 calculates and outputs an interpolated channel response $\hat{H}_k^t$ based on the partial sums output in operation 100 and the adapting coefficients in operation 120. The channel compensation unit 48 outputs a corrected OFDM reception signal $s_k^t$ based on the FFTed OFDM reception signal $r_k^t$ and the interpolated channel response $\hat{H}_k^t$ in operation 130.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to some embodiments of the present invention, a characteristic of time-frequency correlation can be used for channel response estimation, so that higher performance and/or lower complexity can be accomplished. Also, an OFDM signal can be equalized without a great change in performance even under quick changes in a state of a time-varying channel. In addition, the OFDM signal can be equalized using pilot cells used in existing DVB-T or DVB-H systems.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An orthogonal frequency division multiplexing (OFDM) equalizer comprising:
    a memory configured to store OFDM frame information relative to an OFDM frame including a plurality of data cells and a plurality of pilot cells of a fast Fourier transformed OFDM reception signal;
    a partial sum calculator configured to calculate a partial sum of a data cell of the plurality of data cells based on a current pilot cell among the plurality of pilot cells and a fixing coefficient corresponding to the current pilot cell;
    an adapting coefficient calculator configured to calculate a channel response of the data cell and adaptively calculate an adapting coefficient based on the calculated channel response and an interpolated channel response;
    an interpolated channel response calculator configured to calculate the interpolated channel response based on the partial sum output from the partial sum calculator and the adapting coefficient; and
    a channel compensation unit configured to output a corrected OFDM reception signal based on the fast Fourier transformed OFDM reception signal and the interpolated channel response.

2. The OFDM equalizer of claim 1, wherein the equalizer is configured to select the fixing coefficient in accordance with channel delay spread information indicating delay between paths in a multipath communication channel used to transfer the OFDM reception signal.

3. The OFDM equalizer of claim 1, wherein the interpolated channel response is expressed by $$\hat{H}_k^t = \sum_{m \in M'} c_m v[m]$$

where $\hat{H}_k^t$ is the interpolated channel response with respect to a data cell positioned at a k-th subcarrier and a t-th OFDM symbol in the OFDM frame, $c_m$ is the adapting coefficient, m is a natural number or "0", and v[m] is an m-th partial sum.

4. The OFDM equalizer of claim 1, wherein the interpolated channel response is expressed by $$\hat{H}_k^t = v[0] + \sum_{m \in M} c_m v[m],$$

where $\hat{H}_k^t$ is the interpolated channel response with respect to a data cell positioned at a k-th subcarrier and a t-th OFDM symbol in the OFDM frame, m is a natural number, v[0] is a partial sum obtained at the OFDM symbol where the data cell is positioned, v[m] is an m-th partial sum, and $c_m$ is the adapting coefficient.

5. The OFDM equalizer of claim 4, wherein the partial sum calculator is configured to calculate the partial sum using a fixing coefficient of the current pilot cell and a channel response of the current pilot cell.

6. The OFDM equalizer of claim 1, wherein the adapting coefficient calculator is configured to update a pre-update adapting coefficient based on an error signal calculated using a difference between the channel response of the data cell and the interpolated channel response and the pre-update adapting coefficient, and to output an updated adapting coefficient as the adapting coefficient.

7. The OFDM equalizer of claim 6, wherein the updated adapting coefficient is expressed by $c_m^{(n+1)} = c_m^{(n)} + \Delta\{\Re(e_k^t)\Re(v[m]) + \Im(e_k^t)\Im(v[m])\}$, where $c_m^{(n+1)}$ is the updated adapting coefficient, $c_m^{(n)}$ is the pre-update adapting coefficient, $\Delta$ is a predetermined step parameter, $e_k^t$ is the error signal, and v[m] is the partial sum.

8. The OFDM equalizer of claim 7, wherein the error signal is expressed by $e_k^t = H_k^t - \hat{H}_k^t$ or $e_k^t = |H_k^t|(H_k^t - \hat{H}_k^t)$, where $e_k^t$ is the error signal, $\hat{H}_k^t$ is the interpolated channel response of the data cell positioned at a k-th subcarrier and a t-th OFDM symbol in the OFDM frame information, and $H_k^t$ is a channel response of the data cell positioned at the k-th subcarrier and the t-th OFDM symbol.

9. The OFDM equalizer of claim 1, wherein the corrected OFDM reception signal is expressed by $$s_k^t = \frac{r_k^t}{\hat{H}_k^t},$$

where $s_k^t$ is the corrected OFDM reception signal, $r_k^t$ is the fast Fourier transformed OFDM reception signal, and $\hat{H}_k^t$ is the interpolated channel response of a data cell positioned at a k-th subcarrier and a t-th OFDM symbol in the OFDM frame information.

10. The OFDM equalizer of claim 1, wherein the corrected OFDM reception signal is expressed by $$s_k^t = r_k^t \frac{(\hat{H}_k^t)^*}{|\hat{H}_k^t|^2 + \sigma_n^2},$$

where $s_k^t$ is the corrected OFDM reception signal, $r_k^t$ is the fast Fourier transformed OFDM reception signal, and $\sigma_n^2$ is a white Gaussian noise variance.

11. An orthogonal frequency division multiplexing (OFDM) receiver comprising the OFDM equalizer of claim 1.

12. A channel equalization method comprising:
calculating and outputting, using a partial sum calculator, a partial sum of a data cell of a plurality of data cells of a fast Fourier transformed orthogonal frequency division multiplexing (OFDM) reception signal, stored in a memory, based on a current pilot cell among a plurality of pilot cells and a fixing coefficient corresponding to the current pilot cell;
calculating a channel response of the data cell and adaptively calculating and outputting an adapting coefficient based on the calculated channel response and an interpolated channel response;
calculating and outputting the interpolated channel response based on the partial sum and the adapting coefficient; and
outputting, using a channel compensation unit, a corrected OFDM reception signal based on the fast Fourier transformed OFDM reception signal and the interpolated channel response.

13. The method of claim 12, further comprising selecting the fixing coefficient in accordance with channel delay spread information indicating delay between paths in a multipath communication channel used to transfer the OFDM reception signal.

14. The method of claim 12, wherein the interpolated channel response is expressed by $$\hat{H}_k^t = \sum_{m \in M'} c_m v[m],$$

where $\hat{H}_k^t$ is the interpolated channel response with respect to a data cell positioned at a k-th subcarrier and a t-th OFDM symbol in OFDM frame information including a plurality of the data cells and a plurality of the pilot cells, $c_m$ is the adapting coefficient, m is a natural number or "0", and v[m] is an m-th partial sum.

15. The method of claim 12, wherein the interpolated channel response is expressed by $$\hat{H}_k^t = v[0] + \sum_{m \in M} c_m v[m],$$

where $\hat{H}_k^t$ is the interpolated channel response with respect to a data cell positioned at a k-th subcarrier and a t-th OFDM symbol in OFDM frame information including a plurality of the data cells and a plurality of the pilot cells, in is a natural number, v[0] is a partial sum obtained at the OFDM symbol where the data cell is positioned, v[m] is an m-th partial sum, and $c_m$ is the adapting coefficient.

16. The method of claim 15, further comprising calculating the partial sum using a fixing coefficient of the current pilot cell and a channel response of the current pilot cell.

17. The method of claim 12, wherein the calculating and outputting the adapting coefficient comprises updating a pre-update adapting coefficient based on an error signal calculated using a difference between the channel response of the data cell and the interpolated channel response and the pre-update adapting coefficient, and outputting an updated adapting coefficient as the adapting coefficient.

18. The method of claim 17, wherein the updated adapting coefficient is expressed by $c_m^{(n+1)} = c_m^{(n)} + \Delta\{\Re(e_k^t)\Re(v[m]) + \Re(e_k^t)\Re(v[m])\}$, where $c_m^{(n+1)}$ is the updated adapting coefficient, $c_m^{(n)}$ is the pre-update adapting coefficient, $\Delta$ is a predetermined step parameter, $e_k^t$ is the error signal, and v[m] is the partial sum.

19. The method of claim 18, wherein the error signal is expressed by $e_k^t = H_k^t - \hat{H}_k^t$ or $e_k^t = |H_k^t|(H_k^t - \hat{H}_k^t)$ or where $e_k^t$ is the error signal, $\hat{H}_k^t$ is the interpolated channel response of a data cell positioned at a k-th subcarrier and a t-th OFDM symbol in OFDM frame information including a plurality of the data cells and a plurality of the pilot cells, and $H_k^t$ is a channel response of the data cell positioned at the k-th subcarrier and the t-th OFDM symbol.

20. The method of claim 12, wherein the corrected OFDM reception signal is expressed by $$S_k^t = \frac{r_k^t}{\hat{H}_k^t},$$

where $s_k^t$ is the corrected OFDM reception signal, $r_k^t$ is an OFDM reception signal, and $\hat{H}_k^t$ is the interpolated channel response of the data cell positioned at a k-th subcarrier and a t-th OFDM symbol in OFDM frame information including a plurality of the data cells and a plurality of the pilot cells.

21. The method of claim 12, wherein the corrected OFDM reception signal is expressed by $$S_k^t = r_k^t \frac{(\hat{H}_k^t)^*}{|\hat{H}_k^t|^2 + \sigma_n^2},$$

where $s_k^t$ is the corrected OFDM reception signal, $r_k^t$ is an OFDM reception signal, and $\sigma_n^2$ is a white Gaussian noise variance.

22. A non-transitory recording medium for recording a program for performing the equalization method of claim 12.

* * * * *